United States Patent
Shin

(10) Patent No.: US 7,374,467 B2
(45) Date of Patent: May 20, 2008

(54) FABRICATION METHOD OF FIELD EMITTER ELECTRODE AND FIELD EMISSION DEVICE PRODUCED BY USING THE SAME

(75) Inventor: Hyo Soon Shin, Sungnam (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 428 days.

(21) Appl. No.: 10/923,851

(22) Filed: Aug. 24, 2004

(65) Prior Publication Data
US 2005/0258737 A1    Nov. 24, 2005

(30) Foreign Application Priority Data
May 21, 2004    (KR) .................. 10-2004-0036329

(51) Int. Cl.
*H01J 63/04*    (2006.01)
(52) U.S. Cl. .................. 445/24; 445/51; 427/77; 313/495
(58) Field of Classification Search ........ 313/495–497; 445/24, 51; 427/77
See application file for complete search history.

(56) References Cited

FOREIGN PATENT DOCUMENTS

| | | |
|---|---|---|
| JP | 50-19282 | 2/1975 |
| JP | 2000-208027 A | 7/2000 |
| JP | 2000-223005 A | 8/2000 |
| JP | 2001-048511 | 2/2001 |
| JP | 2001-167692 A | 6/2001 |
| JP | 2001-283716 | 10/2001 |
| JP | 2002-197965 | 7/2002 |
| JP | 2004156074 A * | 6/2004 |
| WO | 2004/001107 | 12/2003 |
| WO | 2004-040044 | 5/2004 |

OTHER PUBLICATIONS

Japanese Patent Office, Office Action, mailed Jul. 25, 2006.
Japanese Patent Office, Office Action mailed Apr. 24, 2007 and English Translation.

* cited by examiner

*Primary Examiner*—Nimeshkumar D. Patel
*Assistant Examiner*—Anthony Perry
(74) *Attorney, Agent, or Firm*—Lowe Hauptman Ham & Berner

(57) ABSTRACT

A method for fabricating a field emitter electrode includes the steps of: providing an electrolytic solution containing metal ions to an electrolytic bath; providing carbon nanotubes and a cationic dispersant for preventing the agglomeration of the carbon nanotubes to the electrolytic solution; and applying a predetermined voltage to a cathode drum and an insoluble anodic compartment, both of which are immersed in the electrolytic solution, and forming a metal film containing the carbon nanotubes along the surface of the cathode drum.

7 Claims, 4 Drawing Sheets

FABRICATION METHOD OF FIELD EMITTER ELECTRODE AND FIELD EMISSION DEVICE PRODUCED BY USING THE SAME

RELATED APPLICATIONS

The present application is based on, and claims priority from, Korean Application Number 2004-36329, filed May 21, 2004, the disclosure of which is hereby incorporated by reference herein in its entirety.

BACKGROUND OF THE INVENTION

1. Field of the Invention

The present invention relates to a method for fabricating a field emitter electrode, and more particularly to a method for fabricating a field emitter electrode comprising carbon nanotubes by electrolytic copper plating, and a field emission device produced by using the method.

2. Description of the Related Art

Generally, field emission devices are light sources for emitting electrons in a vacuum environment, and use the principle that electrons emitted from fine particles are accelerated by a strong electric field to collide with fluorescent substances, thus emitting light. Such field emission devices provide superior luminous efficiency and are compact and lightweight, compared to light sources for general illuminators such as incandescent lamps. In addition, since field emission devices do not use heavy metals, unlike fluorescent lamps, they have environmentally friendly advantages. For these reasons, field emission devices have drawn attention as next-generation light sources for various illuminators and display devices.

The performance of field emission devices is mainly determined by emitter electrodes capable of emitting fields. Emitter electrodes currently used to improve electron emission properties have an electrode structure wherein carbon nanotubes (CNTs) are uniformly dispersed and are partially exposed to the surface.

FIG. 1 is a flow chart illustrating a conventional method for fabricating a field emitter electrode comprising carbon nanotubes.

Referring to FIG. 1, the conventional method for fabricating an emitter electrode is initiated by coating an electrode material onto a smooth substrate to form an electrode layer (S11). As the substrate, a metal, glass substrate or the like can be used. A paste of carbon nanotubes and a silver powder in the glassy state is prepared using a suitable resin and a solvent, and is then printed onto the electrode layer (S13). After drying, the resulting structure is subjected to an annealing process to remove the resin and the solvent (S15). The annealed structure is subjected to an additional annealing process, followed by taping, to partially expose the carbon nanotubes to the surface (S17), thereby fabricating the final field emitter electrode.

However, the conventional method has a problem that there is difficulty in uniformly dispersing the carbon nanotubes for the preparation of the paste. Due to this problem, the characteristics of the field emitter electrode may be deteriorated. In addition, sufficient physical and mechanical adherence of the paste to the electrode material cannot be achieved by known paste printing processes.

On the other hand, the conventional method requires the use of a substrate on which an electrode material is coated. Accordingly, when the structure of an emitter electrode needs to be modified in order to produce various field emission devices, there may be limitations depending on the kind of the substrate material used. For example, when an emitter electrode is wound in a cylindrical form to produce a rod-shaped field emission device, the use of a common glass or metal substrate makes modification of the structure of the field emission device difficult.

SUMMARY OF THE INVENTION

Therefore, the present invention has been made in view of the above problems, and it is an object of the present invention to provide a method for fabricating a field emitter electrode on a commercial scale wherein carbon nanotubes are uniformly dispersed by electrolytic copper plating.

It is another object of the present invention to provide a field emission device whose the structure can be easily modified into various shapes by using the method.

In order to accomplish the above objects of the present invention, there is provided a method for fabricating a field emitter electrode, comprising the steps of: providing an electrolytic solution containing metal ions to an electrolytic bath; providing carbon nanotubes and a cationic dispersant for preventing the agglomeration of the carbon nanotubes to the electrolytic solution; and applying a predetermined voltage to a cathode drum and an insoluble anodic compartment, both of which are immersed in the electrolytic solution, and forming a metal film containing the carbon nanotubes along the surface of the cathode drum.

In the present invention, the metal is selected from the group consisting of copper, nickel, chromium, gold, aluminum and alloys thereof. Preferably, the metal ions are copper ions, and the metal film is a copper foil. In this case, the electrolytic solution containing the metal ions may be $CuSO_4 \cdot 6H_2O$.

In one embodiment of the present invention, the step of providing carbon nanotubes and a cationic dispersant to the electrolytic solution can be carried out by mixing the carbon nanotubes and the cationic dispersant and pulverizing the mixture, and feeding the pulverized mixture to the electrolytic solution.

In this embodiment, the pulverized mixture is preferably dispersed by sonication.

In another embodiment of the present invention, the step of providing carbon nanotubes and a cationic dispersant to the electrolytic solution can be carried out by feeding the carbon nanotubes and the cationic dispersant to the electrolytic solution and uniformly dispersing the carbon nanotubes and the cationic dispersant in the electrolytic solution.

The cationic dispersant is preferably selected from the group consisting of benzalkonium chloride, sodium dodecyl sulfate and polyethylenimine, and is preferably added in an amount of about 2 wt % to about 200 wt % based on the amount of the carbon nanotubes.

In a preferred embodiment of the present invention, the method further comprises the step of etching the surface of the metal film so that some of the carbon nanotubes are exposed to the outside of the metal film.

In accordance with another aspect of the present invention, there is provided a field emission device comprising an emitter electrode fabricated by the method. The field emission device of the present invention comprises: a field emitter electrode fabricated using metal ions, an electrolytic solution containing carbon nanotubes and a cationic dispersant for preventing the agglomeration of the carbon nanotubes by electrolytic plating; a transparent electrode opposed to the emitter electrode between which a vacuum region is formed; and a fluorescent layer formed on a surface of the transparent electrode facing the emitter electrode.

The metal ions contained in the electrolytic solution may be copper ions, and the emitter electrode may be a copper foil in which the carbon nanotubes are impregnated.

In one embodiment of the present invention, the field emission device may have a plate-shaped structure. Specifically, the emitter electrode and the transparent electrode are arranged substantially parallel to each other through the vacuum region.

In another embodiment of the present invention, the field emission device may have a rod-shaped structure. Specifically, the emitter electrode is in the shape of a rod having an external surface, and the transparent electrode has a spherical shape and is opposed to the emitter electrode between which a vacuum region is formed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention will now be described in more detail with reference to the accompanying drawings.

Figure 1:
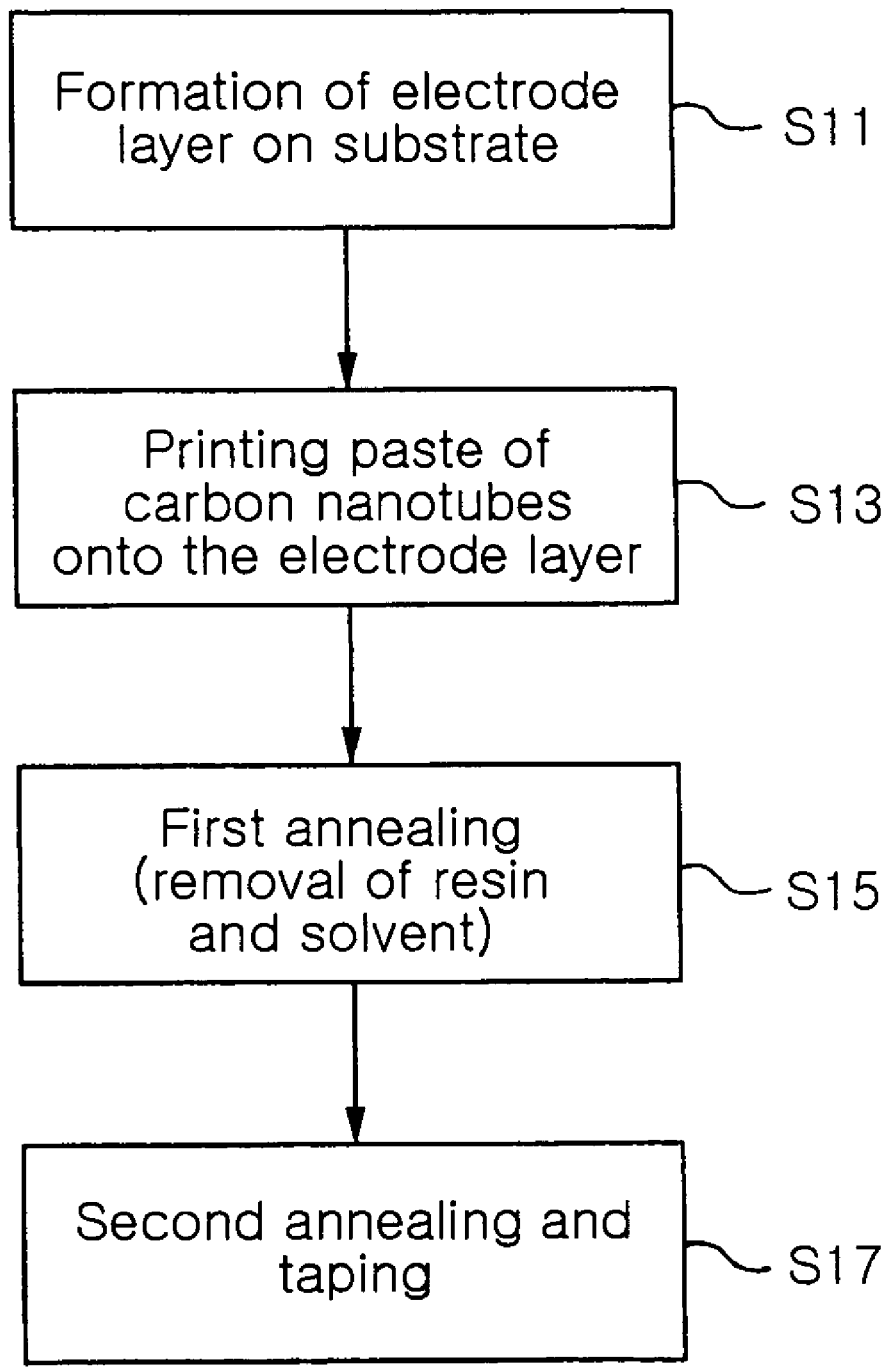
FIG. 1 is a flow chart illustrating a conventional method for fabricating a field emitter electrode.
Figure 2:
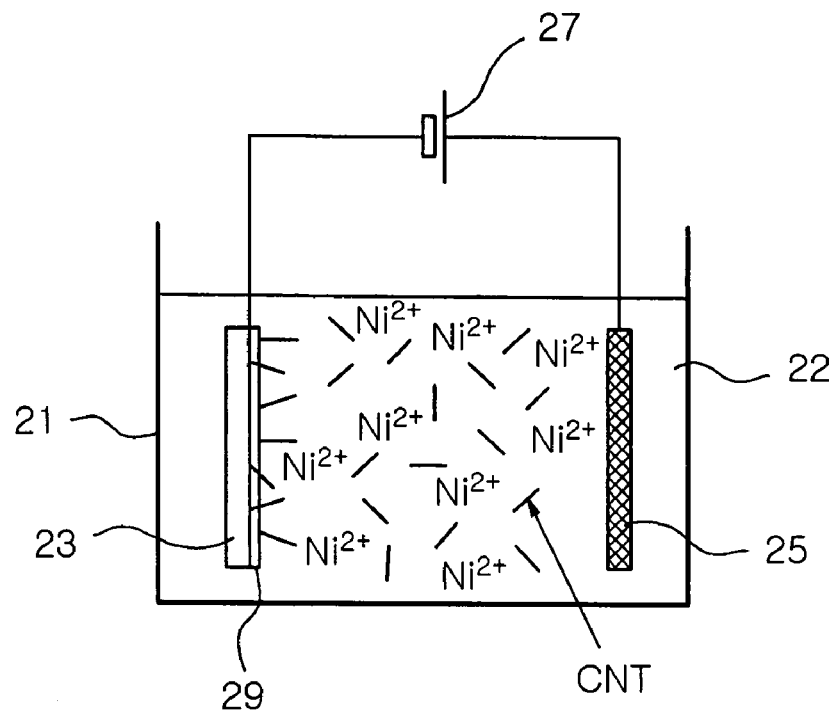
FIG. 2 is a conceptual diagram schematically illustrating a principle applied to a method for fabricating a field emitter electrode according to the present invention.

FIG. 2 is a diagram schematically illustrating a eutectic plating principle applied to the method for fabricating a field emitter electrode according to the present invention.

Referring to FIG. 2, a cathodic compartment 23 and an anodic compartment 25 are immersed in an electrolytic solution 22 stored in an electrolytic bath 21. The electrolytic solution 22 contains Ni ions ($Ni^{2+}$) and carbon nanotubes (CNTs). When a predetermined voltage is supplied from a power source 27 which is electrically connected to both the cathodic compartment 23 and the anodic compartment 25, the Ni ions contained in the electrolytic solution 22 are deposited together with the carbon nanotubes (CNTs) on the cathodic compartment to form a nickel (Ni) layer 29 containing the carbon nanotubes.

As such, the present invention employs an electrolytic plating process based on the eutectic plating principle, unlike conventional methods using paste. According to the method of the present invention, since the carbon nanotubes (CNTs) are not in a viscous paste state, but are fed to the electrolytic solution 22, uniform dispersion of the carbon nanotubes (CNTs) is ensured. Accordingly, the Ni layer 29 contains uniformly dispersed carbon nanotubes.

An electrolytic metal plating process can be applied to the method of the present invention, together with the eutectic plating principle. By using the electrolytic metal plating process, the metal film containing the carbon nanotubes used as a field emitter electrode can be easily fabricated on a commercial scale.

Figure 3:
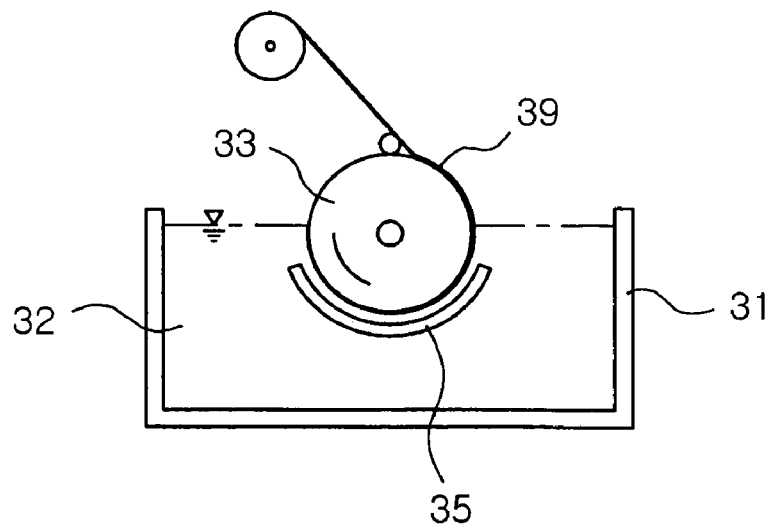
FIG. 3 is a schematic diagram of an electrolytic plating apparatus used in a method for fabricating a field emitter electrode according to the present invention.

FIG. 3 is a schematic diagram of an electrolytic plating apparatus used in the method for fabricating a field emitter electrode according to the present invention.

Referring to FIG. 3, an electrolytic bath in which an electrolytic solution is stored is shown. A cathode drum and an anodic compartment are immersed in the electrolytic solution.

The electrolytic solution employed in the present invention contains ions of a metal used as a main raw material of an emitter electrode, carbon nanotubes, and optionally, a cationic dispersant. The metal used as a main raw material of an emitter electrode can be suitably selected from copper, nickel, chromium, gold, aluminum and alloys thereof.

On the other hand, since carbon nanotubes are materials having a very large surface area and a low density, they tend to agglomerate, impeding uniform dispersion of the carbon nanotubes. For better dispersion, a dispersant is fed to the electrolytic solution. The dispersant used in the present invention has cationic properties so that it enables the anionic carbon nanotubes to be positively charged. By the action of the cationic dispersant, the carbon nanotubes together with the metal ions are easily deposited on the cathode drum. When a predetermined voltage is supplied from a power source (not shown) which is electrically connected to the cathode drum 33 and the anodic compartment 35, the metal ions contained in the electrolytic solution 32 together with the carbon nanotubes are deposited on the cathode drum 33 to form a metal film 39 containing the carbon nanotubes.

As explained previously, since the carbon nanotubes contained in the electrolytic solution have cationic properties in the uniformly dispersed state by the action of the cationic dispersant, they can be uniformly dispersed in the metal film deposited on the cathode drum. The metal film deposited on the cathode drum is continuously obtained along the rotating cathode drum. Finally, the metal film thus obtained is cut into desired dimensions and can be used as a field emitter electrode.

The cationic dispersant employed in the present invention may be selected from the group consisting of benzalkonium chloride, sodium dodecyl sulfate and polyethylenimine. For better dispersion, the cationic dispersant is added in an amount of 2 wt % to 200 wt %, based on the amount of the carbon nanotubes to be fed. The dispersant is commonly used in an amount of less than 2 wt %, but is preferably used in an amount of at least 2 wt % in the present invention in order to sufficiently disperse highly cohesive carbon nanotubes. When the cationic dispersant is added in an amount exceeding 200 wt %, it acts as an impurity, causing deterioration in electrolytic plating properties.

The cationic dispersant together with the carbon nanotubes may be added in various ways. The step of feeding the cationic dispersant and the carbon nanotubes to the electrolytic solution in the method of the present invention is divided into a post-dispersion treatment process and a pre-dispersion treatment process, based on the time point at which the cationic dispersant and the carbon nanotubes are fed.

The post-dispersion treatment process is carried out by directly feeding the carbon nanotubes and the cationic dispersant to the electrolytic solution, and uniformly dispersing them by a known technique, e.g., stirring.

In contrast, the pre-dispersion treatment process is carried out by mixing/pulverizing the carbon nanotubes and cationic dispersant using a mixing/pulverizing process, e.g., ball-milling and feeding the pulverized mixture to the electrolytic solution. According to the pre-dispersion treatment process, the pulverized mixture may be further dispersed using a suitable disperser, e.g., an ultrasonic homogenizer. In the pre-dispersion treatment process, the agglomerated carbon nanotubes are pulverized so that the dispersant can be effectively adsorbed on the surface of the pulverized carbon nanotubes. Accordingly, the pre-dispersion treatment process is advantageous in terms of excellent dispersion effects and stable impartment of cationic properties to the carbon nanotubes, compared to the post-dispersion treatment process.

The method for fabricating a field emitter electrode according to the present invention may further comprise the step of etching the surface of the metal film. The etching step is an optional step for the metal film, and is carried out to sufficiently expose the carbon nanotubes to the outside of the metal film surface. Accordingly, the field emitter electrode has better field emission properties due to the etching step.

Hereinafter, the method for fabricating a field emitter electrode according to the present invention will be explained in more detail with reference to the following specific examples.

EXAMPLE

In this example, the electrolytic copper plating apparatus shown in FIG. 3 was used. An electrolytic solution containing 400 g/l of $CuSO_4.6H_2O$, 45 g/l of $H_3BO_3$ and 30 g/l of $NiCl_2.5H_2O$ was prepared. Carbon nanotubes and a dispersant were previously dispersed before being fed to the electrolytic solution. Specifically, after 50 mg of the carbon nanotubes, 100 wt % of benzalkonium chloride (BKC) as the dispersant and 200 g of pure water were placed in a container, they were mixed and pulverized by ball-milling for 1 hour. Thereafter, the resulting pulverized mixture was uniformly dispersed using an ultrasonic homogenizer for 1 hour.

After the dispersed mixture was fed to an electrolytic bath containing the electrolytic solution, the plating apparatus was operated at a current density of 0.5 A/dm$^2$ and a rotation speed of a cathode drum of 1.2 m/min., to obtain an electrodeposited copper foil having a thickness of about 30 μm in which the carbon nanotubes are contained.

Figure 4A:
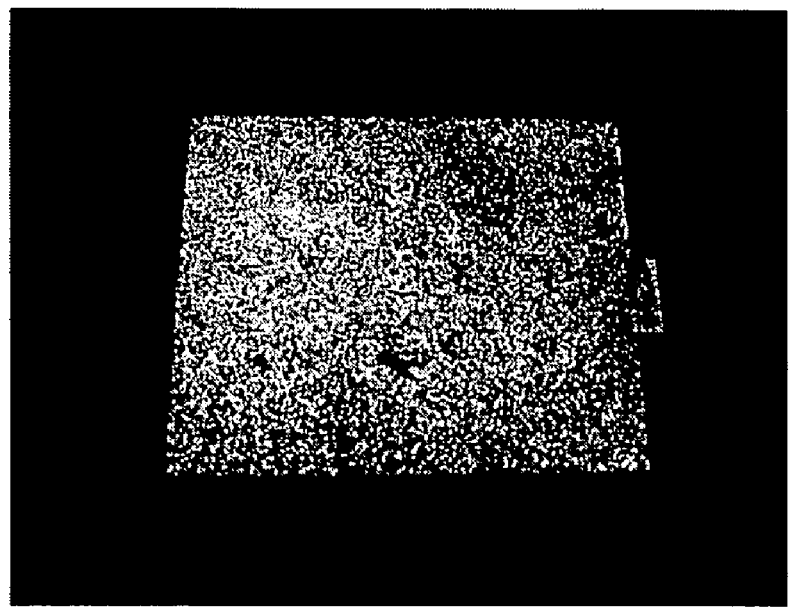
FIGS. 4a and 4b are photographs of a field emitter electrode fabricated by a method of the present invention.
Figure 4B:
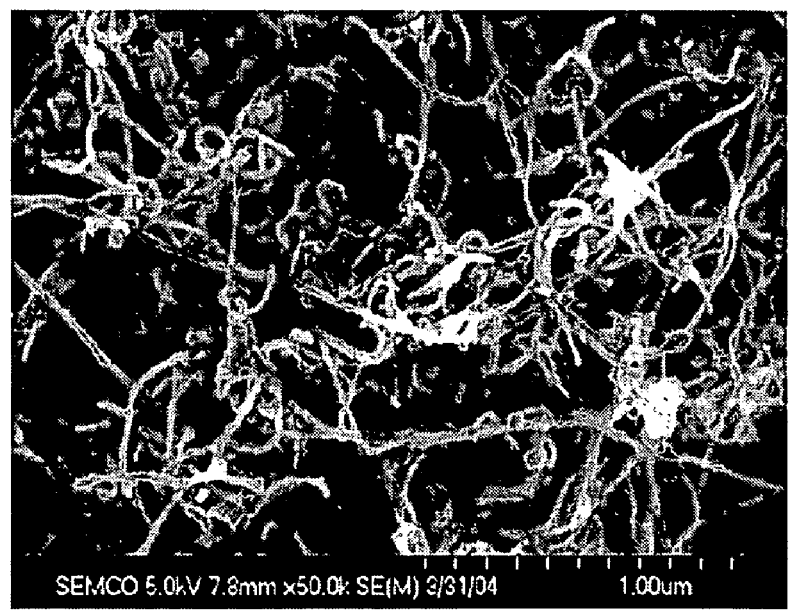

FIG. 4a is a photograph of the copper foil containing the carbon nanotubes, and FIG. 4b is an SEM image of the copper foil surface.

FIG. 4b shows detailed distribution state of the carbon nanotubes on the surface of the copper foil shown in FIG. 4a.

FIG. 4b shows that the carbon nanotubes present on the copper foil surface are uniformly dispersed in various arrangements.

Another advantage of the method for fabricating a field emitter electrode according to the present invention is the formation of a metal film usable as an emitter electrode without the use of a substrate. Accordingly, field emission devices having various structures can be produced in a simple manner. This advantage is particularly apparent when a relatively flexible copper foil is used as a field emitter electrode because of a high degree of freedom in design.

Figure 5A:
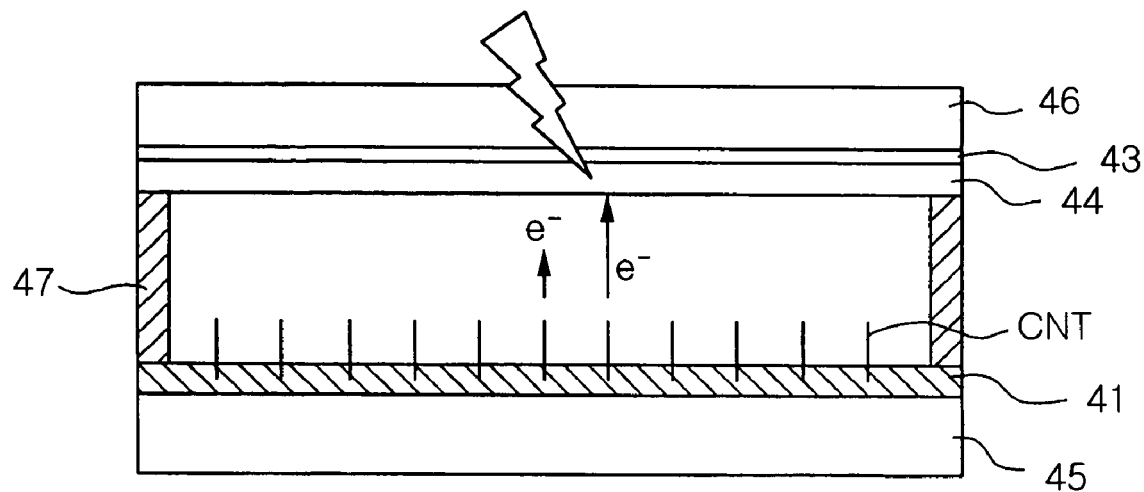
FIGS. 5a and 5b are schematic diagrams of field emission devices comprising a field emitter electrode fabricated by a method of the present invention.
Figure 5B:
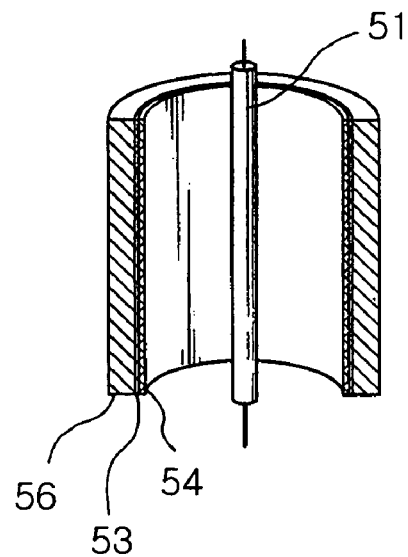

FIGS. 5a and 5b are schematic diagrams of field emission devices comprising the field emitter electrode fabricated by the method of the present invention.

FIG. 5a is a cross-sectional view of a plate-shaped field emission device according to one embodiment of the present invention. The plate-shaped field emission device is mainly used as a light source for LCD backlights.

Referring to FIG. 5a, the field emission device comprises a field emitter electrode 41, a transparent electrode 43 opposed to the emitter electrode 41 between which a vacuum region is formed, and a fluorescent layer 44 formed on a surface of the transparent electrode 43 facing the emitter electrode 41. In the field emission device, the emitter electrode 41 and the transparent electrode 43 are arranged substantially parallel to each other through the vacuum region.

The field emitter electrode 41 may be a copper foil fabricated using an electrolytic solution containing metal ions, carbon nanotubes and a cationic dispersant for preventing the agglomeration of the carbon nanotubes in accordance with the method of the present invention.

The field emission device of this embodiment comprises a sealing member 44 for creating a vacuum between the emitter electrode 41 and the transparent electrode 43, and a top protective substrate 46 formed on top of the transparent electrode 43. The top protective substrate 46 may be made of a transparent glass for better light emission. In the field emission device of this embodiment, a bottom substrate 45 is formed at the bottom of the emitter electrode 41. However, since the field emitter electrode 41 can be fabricated only as a metal film without the formation of a substrate by an electrolytic metal plating process, the bottom substrate 41 can be omitted according to design needs.

FIG. 5b is a cross-sectional view of a rod-shaped field emission device according to another embodiment of the present invention. The rod-shaped field emission device can be used as a light source for illuminators which are capable of replacing fluorescent lamps.

Referring to FIG. 5b, the field emission device comprises a rod-shaped field emitter electrode 51, a cylindrical transparent electrode 53 opposed to the emitter electrode 51 between which a vacuum region is formed, and a fluorescent layer 54 formed on a surface of the transparent electrode 53 facing the emitter electrode 51. The field emitter electrode 51 may be a copper foil fabricated using an electrolytic solution containing copper ions, carbon nanotubes and a cationic dispersant for preventing the agglomeration of the carbon nanotubes, similarly to the field emitter electrode shown in FIG. 5a.

As stated earlier, the emitter electrode 51 may be fabricated without the formation of a bottom substrate by electrolytic metal plating. Accordingly, a highly flexible metal film can be easily wound to fabricate the rod-shaped emitter electrode shown in FIG. 5b.

Consequently, since the emitter electrode of the present invention can be fabricated into various shapes, it can be used to produce field emission devices having various structures. In addition, the emitter electrode of the present invention has an advantage of easy adherence to substrates having various shapes.

The scope of the present invention is not limited by the above embodiments and the accompanying drawings, but only by the appended claims. Therefore, those skilled in the art will appreciate that various modifications, additions and substitutions are possible, without departing from the technical spirit of the invention as disclosed in the appended claims, and these changes are within the scope of the present invention.

As apparent from the foregoing, according to the method of the present invention, a field emitter electrode in which carbon nanotubes are uniformly dispersed can be easily fabricated by electrolytic metal plating.

In addition, according to the method of the present invention, the field emitter electrode can be fabricated only as a metal film without the formation of a bottom substrate, in a simple manner on a commercial scale. Accordingly, the field emitter electrode can be used to produce field emission devices having various structures.

What is claimed is:

1. A method of fabricating a field emitter electrode, the method comprising the steps of:
   providing an electrolytic solution containing metal ions in an electrolytic bath;
   providing carbon nanotubes and a cationic dispersant for preventing the agglomeration of the carbon nanotubes in the electrolytic solution; and
   applying a predetermined voltage to a cathode drum and an insoluble anodic compartment, both of which are immersed in the electrolytic solution, and forming a metal film containing the carbon nanotubes on the surface of the cathode drum;
   wherein the step of providing the carbon nanotubes and cationic dispersant in the electrolytic solution includes:
   mixing the carbon nanotubes and the cationic dispersant, and pulverizing the mixture; and
   feeding the pulverized mixture to the electrolytic solution.

2. The method according to claim 1, wherein the pulverized mixture is further dispersed by sonication.

3. The method according to claim 1, wherein the metal is selected from the group consisting of copper, nickel, chromium, gold, aluminum and alloys thereof.

4. The method according to claim 1, wherein the metal ions are copper ions, the metal film is a copper foil, and the electrolytic solution containing the metal ions is $CuSO_4 \cdot 6H_2O$.

5. The method according to claim 1, wherein the cationic dispersant is selected from the group consisting of benzalkonium chloride, sodium dodecyl sulfate and polyethylenimine.

6. The method according to claim 5, wherein the cationic dispersant is added in an amount of about 2 wt % to about 200 wt % based on the amount of the carbon nanotubes.

7. The method according to claim 1, further comprising the step of etching the surface of the metal film so that some of the carbon nanotubes are exposed to the outside of the metal film.

* * * * *